Jan. 11, 1949.    C. A. SNYDER    2,458,961
TELESCOPING TUBE SCREW JACK
Filed Aug. 11, 1944
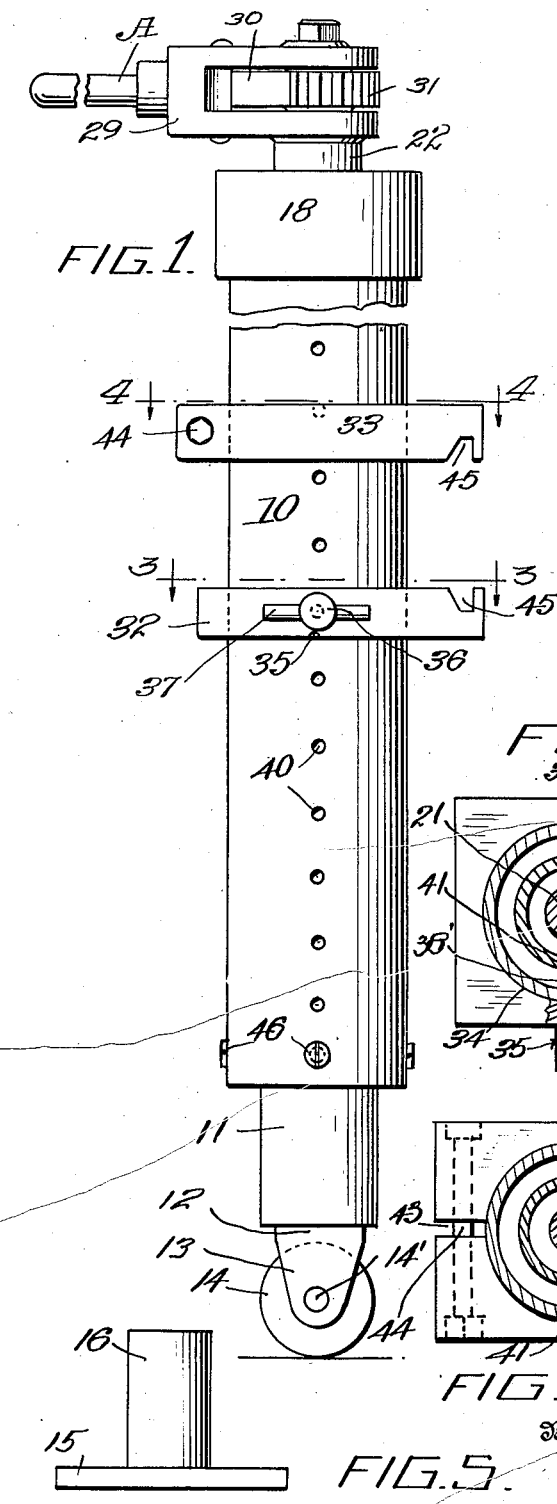
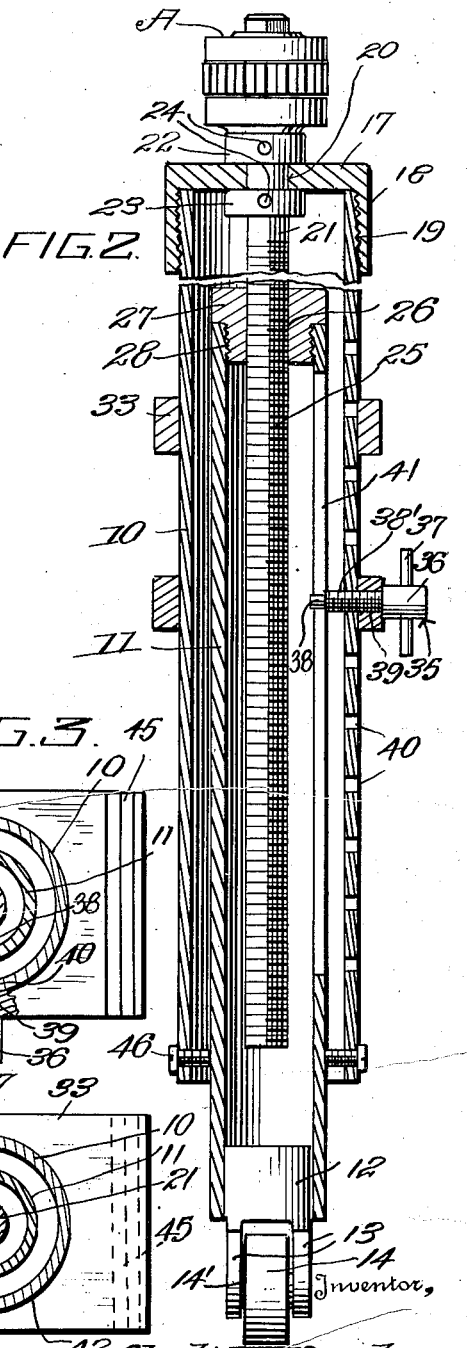
Charles A. Snyder, Inventor Patented Jan. 11, 1949

2,458,961

UNITED STATES PATENT OFFICE 2,458,961

TELESCOPING TUBE SCREW JACK

Charles A. Snyder, Philadelphia, Pa.

Application August 11, 1944, Serial No. 549,028

7 Claims. (Cl. 254—100)

This invention relates to a jack primarily, but not necessarily, to be used in connection with the lifting of automobiles adjacent a wheel or wheels thereof for the purposes of changing tires, inspecting, repairing and the like.

It is particularly aimed to provide a construction which for the most part is, capable of manufacture from standard piping or tubing so as to practically avoid the necessity of specially manufacturing parts in the production and assembly thereof.

As a result, I am able to use not only standard pipe and tube material, but may in many instances, utilize discarded pipes and tubes.

A further object is to provide a construction having novel means for rigidly securing the jack to the bar of a bumper or the like on an automobile in such manner that the lifting or extension of the jack will draw the latter into place without danger of slipping thereof or lowering of the automobile.

It is also aimed to provide novel means for adjustably securing the bumper bar attaching means to the jack and which coacts with the remainder thereof to hold the coacting barrels or the like against relative turning and also to hold at least one of the bumper bar engaging jaws against turning relatively to the barrels.

The more specific objects and advantages will become apparent from a consideration of the description following taken in connection with accompanying drawings illustrating an operative embodiment by way of example.

In said drawings:

Figure 1 is a view in elevation, partly broken away, illustrating the improved jack;

Figure 2 is a view of said jack taken at a right angle to Figure 1 and primarily being in central longitudinal section;

Figure 3 is a cross section taken on the line 3—3 of Figure 1;

Figure 4 is a cross section taken on the line 4—4 of Figure 1, and

Figure 5 is an elevation of a modified form of supporting base which may be used.

Referring specifically to the drawings, wherein like reference characters designate like or similar parts throughout the different views, I provide outer and inner barrels at 10 and 11, respectively. These barrels are preferably tubular and may be made from standard pipes or tubing and even from discarded pipes or tubing, to facilitate expeditions manufacture and avoid the necessity of employing special parts in the manufacture and assembly of the jack, especially under existing wartime conditions.

Said inner barrel 11 has a stud 12 press-fitted or otherwise rigidly attached in the lower end thereof and it may be in the form of a bracket having depending ears 13 mounting a pin 14 on which a wheel or caster 14, disposed between the ears 13, is journaled or fastened. In lieu of such roller 14 as a base, I may use a plate 15, from which a stud 16 rises and which is adapted for press-fitting or other rigid fastening in the lower end of the barrel 11 like the stud 12.

Outer barrel 10 at the top has a detachable cap 17 provided with a depending flange 18 screw-threaded at 19 to said barrel 10. Journaled or swiveled in an opening 20, centrally of the cap 17, is an operating screw 21. This screw is held against axial displacement in any suitable manner as by means of collars 22 and 23 secured on the screw 21 by means of pins at 24 and respectively engaging outer and inner surfaces of the cap.

Said screw 21 has threads at 25 which are engaged with those in a bore opening 26 of a nut 27, screw-threaded at 28 to the interior of the inner barrel 11 at the top.

Any suitable mechanism generally designated A may be associated with the top of the screw 21 in order to turn it so that through the coaction of the screw-threads at 25 and 26, the outer barrel 10 will be lifted or extended. For example, a conventional handle 29 may be carried by the screw, being detachable or foldable, as preferred, and having coaction at a pawl 30, which is preferably reversible, with a ratchet wheel 31.

On the exterior of the barrel 10 I provide novel adjustable means for rigid attachment or clamping to a bumper bar of an automobile, or to any equivalent part of an automobile or other object. To this end, I use a pair of plates or jaws 32 and 33. Jaw 32 has an opening 34 to enable it to surround, turn and slide on the outer barrel 10 and be fastened at any permissible adjustment by a screw element 35 which element has a head 36 and a rod 37 to facilitate turning. Screw 35 also has a screw-threaded portion 38' engaged with screw threads in an opening 39 of the jaw 32. Said portion 38' extends loosely through openings 40 in the barrel 10 and terminally at a projection 38 is engaged in a longitudinally extending slot 41 provided in the inner barrel 11. This screw 35 may be arranged in any of the openings 40 according to the adjustment desired and in all positions of adjustment of said screw, the shank 38 engages the slot 41. The screw 35 thus performs various functions, for instance, adjustably mounting the jaw 32, holding such jaw against turning relatively to the barrels, and through the engagement of shank 38 in slot 41, holding the inner barrel against turning relatively to the outer barrel so that the operation of the screw 21 will be effective to relatively extend the barrels.

Jaw 33 has an opening at 32 enabling it to surround the barrel 10 and turn and slide thereon in adjusting it. This jaw 33 may be split at 43 and have a bolt 44 extended across the split for tightening to rigidly clamp the jaw 33 in registry with the jaw 32. It will be noted that the jaws 32 and 33 have grooves or the equivalent as at 45, facing each other and alined, for engagement with the opposite edges of a bumper bar. Since the said jaw 32 cannot be accidentally displaced, any slight maladjustment of the said jaw 33 will be adjusted automatically since the bumper bar will pull the jaw 33 into alinement or registry with the jaw 32.

I may use a suitable means such as screws at 46, adjacent the lower end of the barrel 10, for abutment with the barrel 11, to prevent undue wobbling of the barrels at this point.

It will be seen that with the jaws 32 and 33 rigidly attached to a bumper bar, that the handle mechanism A may be turned continuously or with a pawl and ratchet action to turn screw 21 and through its engagement with the threads at 26, cause the barrel 10 to lift the bumper bar through the extension of the barrel relatively to the barrel 11. During such action, the barrel 11 will be held against turning relatively to the barrel 10, by the engagement therewith of screw 35 at the projection 38 and elongated slot 41 engaged thereby.

Various changes may be resorted to provided they fall within the spirit and scope of the invention.

I claim:

1. A jack comprising an outer barrel, an inner barrel therein, a base for the inner barrel, means operable to extend said barrels, jaw means on the outer barrel for clamping engagement with a part to be lifted, said jaw means including an element adjustably mounted by the outer barrel and engageable with the inner barrel to prevent relative turning of the barrels during extension.

2. A jack comprising an outer barrel, an inner barrel therein, screw means operable to extend the barrels, means carried by the outer barrel for attachment to a part to be lifted, said means including an element extending through the outer barrel and in relative sliding engagement with the inner barrel to prevent turning of the barrels.

3. A jack according to claim 2 wherein said element is a screw which is threaded to said means and wherein the inner barrel has an elongated slot into which the terminal of said screw extends.

4. A jack comprising an outer barrel, an inner barrel therein, screw means operable to extend the barrels, a jaw on the outer barrel, a screw threaded to said jaw, said outer barrel having an opening through which said screw extends, said inner barrel having an elongated slot into which the inner extremity of the screw projects to prevent turning of the barrels, and a jaw on the outer barrel coacting with the first mentioned jaw to engage a part to be lifted.

5. A jack according to claim 4 wherein the second mentioned jaw is split and a clamping element is carried by the jaw and extends across the split.

6. A jack comprising an outer barrel, a cap mounted thereon, a screw rod journaled in said cap, means holding the screw rod against axial movement relatively to the cap, an inner barrel surrounded by the outer barrel having a nut screwed to the top thereof, said screw rod being threaded through said nut, a base carried by the innner barrel, said inner barrel having an elongated slot, a series of longitudinally alined holes provided through the outer barrel, a jaw carried by the outer barrel, a second jaw on the outer barrel, said jaws being disposed for clamping engagement with a part to be lifted, a screw threaded to the second mentioned jaw and passable through either of said openings, and said screw at its inner extremity engaging said slot to prevent relative turning of the barrels.

7. A jack comprising an outer barrel, an inner barrel therein, means operable to extend said barrels, jaw means on the outer barrel for clamping engagement with a part to be lifted, said jaw means including an element securing same against rotation relative to the outer barrel and engageable with the inner barrel to prevent relative turning of the barrels during extension.

CHARLES A. SNYDER.

REFERENCES CITED

The following references are of record in the file of this patent:

UNITED STATES PATENTS

| Number | Name | Date |
|---|---|---|
| 646,816 | Enger | Apr. 3, 1900 |
| 964,394 | Coddington | July 12, 1910 |
| 1,251,046 | Kennedy | Dec. 25, 1917 |
| 1,631,889 | Rappley | June 7, 1927 |
| 1,786,866 | Rodman | Dec. 30, 1930 |
| 1,905,624 | Dwork | Apr. 25, 1933 |

FOREIGN PATENTS

| Number | Country | Date |
|---|---|---|
| 528,933 | Great Britain | Nov. 11, 1940 |
| 791,725 | France | Oct. 7, 1935 |
| 808,476 | France | Nov. 14, 1936 |